United States Patent [19]

Kauderer

[11] 3,843,936

[45] Oct. 22, 1974

[54] STABILIZED OSCILLATOR

[76] Inventor: Friedrich Kauderer, Winibaldstrasse 24, 8190 Wolfratshausen, Germany

[22] Filed: Oct. 1, 1973

[21] Appl. No.: 402,370

[30] Foreign Application Priority Data

Sept. 29, 1972 Germany ........................... 2247974

[52] U.S. Cl. ......................... 331/20, 331/8, 331/18, 331/26

[51] Int. Cl. ............................................. H03b 3/04

[58] Field of Search ...................... 331/18, 20, 26, 8

[56] References Cited

UNITED STATES PATENTS

| | | | |
|---|---|---|---|
| 3,080,533 | 3/1963 | Edwards | 331/8 |
| 3,130,376 | 4/1964 | Ross | 331/18 |
| 3,204,197 | 8/1965 | Marzan | 331/18 |
| 3,249,886 | 5/1966 | Anderson et al. | 331/8 |
| 3,311,841 | 3/1967 | Corney et al. | 331/18 |

*Primary Examiner*—John Kominski
*Attorney, Agent, or Firm*—Hill, Gross, Simpson, Van Santen, Steadman, Chiara & Simpson

[57] ABSTRACT

A stabilized oscillator employs a circuit for stabilizing the frequency and phase of the oscillator, without the requirement of two separate discriminator circuits, the combination incorporating a control loop including a phase control apparatus for producing a signal whose arithmetic mean over a predetermined time permits synchronization of the oscillator in both frequency and phase with a standard source of signals.

7 Claims, 3 Drawing Figures

STABILIZED OSCILLATOR

BACKGROUND

1. Field of the Invention

The present invention relates to a stabilized oscillator, and more particularly, to such an oscillator in which the frequency and phase of the output signal is adapted to be synchronized with the phase of a standard signal.

2. The Prior Art

Many techniques for stabilizing oscillators are known in the art, by which the phase and/or frequency of a free-running oscillator may be synchronized with a source of standard signals generated, for example, by means of a crystal controlled oscillator or the like.

Phase synchronization permits the precise synchronization of the phase of the free-running oscillator with the standard signal, and employs a phase discriminator or the like. However, the phase discriminator is unable to detect a difference in phase of more than 360°, and so it is necessary to provide some additional control means in addition to the phase discriminator. Typically, such additional control means is a frequency discriminator, by which the frequency of the oscillator to be controlled is first brought into a range approximately equal to the desired frequency, after which the phase discriminator can bring about exact synchronization of the phase of the signal with that of the standard signal.

In some circuits known in the prior art, the frequency of the free-running oscillator has been varied periodically by modulation techniques, so that the output frequency thereof sweeps over a range to insure that it passes through a range of frequencies, with the modulation ceasing after phase synchronization is achieved.

In all of the known methods of the prior art, it is necessary to use a separate control device besides the phase discriminator, with the result that such methods are relatively costly and complicated.

BRIEF SUMMARY OF THE PRESENT INVENTION

It is a principal object of the present invention to provide a system for stabilizing the output of an oscillator with reference to a standard signal in such a manner that the frequency and phase of a free-running oscillator are both synchronized with a standard signal, but no control device other than a phase discriminator is required.

Another object of the present invention is to provide such a system which may be simply and economically constructed.

These and other objects and advantages of the present invention will become manifest by an examination of the following description and the accompanying drawings.

In one embodiment of the present invention, there is provided a circuit for developing a control signal for synchronizing an oscillator in phase and frequency comprising means for developing, for each cycle of the free-running oscillator, a sloping wave form having a slope which is independent upon the frequency of the free-running oscillator, and a non-sloping wave from having a period which is dependent upon the frequency of said oscillator, whereby the instantaneous phase of said oscillator may be identified by the instantaneous value of a portion of said sloping wave form, and the frequency of said oscillator may be identified by the arithmetic mean value of said sloping and non-sloping wave forms, taken together.

BRIEF DESCRIPTION OF THE DRAWINGS

Reference will now be made to the accompanying drawings in which.

Figure 1:
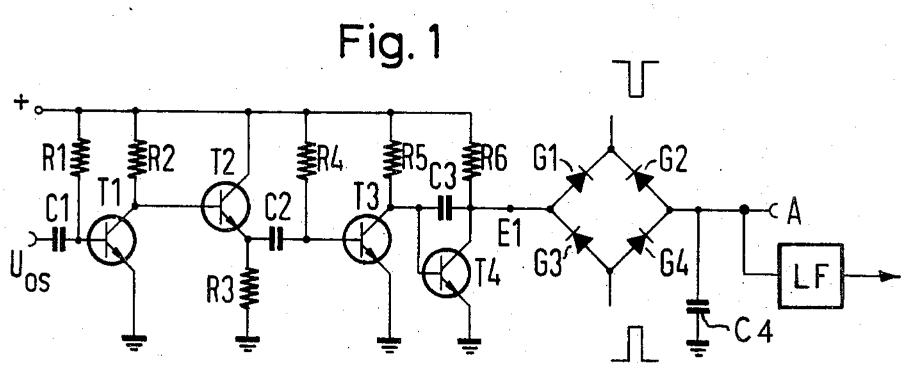
FIG. 1 is a schematic circuit diagram of an exemplary embodiment of the present invention.
Figure 2:
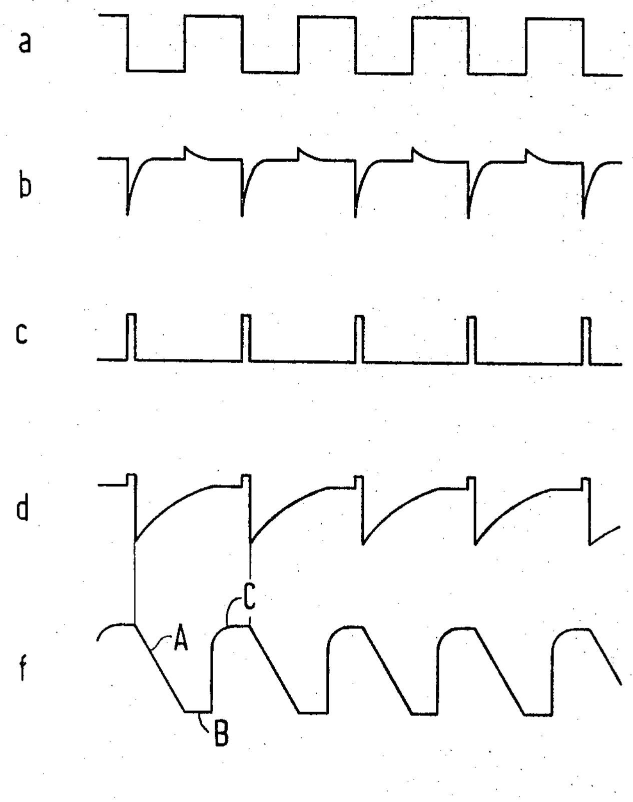
FIG. 2 is an illustration of a series of wave forms derived in the operation of the apparatus of FIG. 1.

Referring first to FIG. 1, one input of the circuit is supplied with the output of a free-running oscillator. This is applied to the input terminal Uos after it has been shaped in the form of a square wave corresponding in frequency to the frequency of the free-running oscillator. The square wave applied to the input terminal Uos is illustrated in FIG. 2*a*.

A differentiating circuit including a capacitor C1 and a resistor R1 is connected between the input terminal Uos and a reference potential, indicated in FIG. 1 by a plus sign. The junction of the capacitor C1 and the resistor R1 is connected to the base of a transistor T1, the emitter of which is grounded, and the collector of which is connected to the reference potential through a resistor R2. The voltage present at the base of the transistor T1 is illustrated in FIG. 2*b*. Since the transistor T1 is biased, by way of the resistor R1, in such a way that it is normally conductive, only the negative-going pulses are effective in changing the operation of the transistor T1. These are effective in cutting off the transistor T1 periodically, producing positive-going pulses at the collector, which pulses are illustrated in FIG. 2*c*.

The collector of the transistor T1 is connected to the base of a transistor T2, the collector of which is connected to the reference potential, and the emitter of which is connected by a resistor R3 to ground. The transistor T2 serves as an emitter follower buffer stage, so that the same pulses present on the collector of the transistor T1 appear at the emitter of the transistor T2. These pulses are applied by a capacitor C2 to the base of a third transistor T3.

The base of the transistor T3 is connected through a resistor R4 to the reference potential, and its collector is connected through a resistor R5 to the reference potential. Its emitter is connected directly to ground. On the appearance of a positive pulse at the emitter of the transistor T2, the capacitor C2 is charged by current flowing through the base-emitter junction of the transistor T3. At the trailing edge of the pulse, the transistor T3 is blocked, and the capacitor C2 is discharged through the series circuit including the resistor R3 and R4 and the circuit (not shown) extending between the reference potential and ground. When the capacitor C2 becomes sufficiently discharged, the transistor T3 again becomes conductive. The wave form produced at the base of the transistor T3 is illustrated in FIG. 2*d*.

A transistor T4 has its base connected to the collector of the transistor T3, and its emitter is grounded. A capacitor C3 is connected between the collector and base of the transistor T4, and the collector of the transistor T4 is also connected to the reference potential by a resistor R6. The transistor T4 functions as a Miller integrator stage and produces a ramp-shaped or sloping voltage drop across the collector resistor R6.

While the transistor T3 is conductive, the base of the transistor T4 is held substantially at zero potential, through the collector emitter circuit of the transistor T3. Therefore, the collector of the transistor T4 exhibits a relatively high potential at this time. When the transistor T3 becomes cut off, the Miller integrator circuit is released and produces a falling potential at the collector of the transistor T4. This potential continues to fall until the transistor T4 becomes saturated, which then maintains a relatively low potential until the transistor T3 again becomes conductive. As a result, the wave form illustrated in FIG. 2*f* is provided at point E1 at the collector of the transistor T4. This same wave form is shown on a larger scale in FIG. 3.

The point E1 is connected to a four-diode bridge formed by diodes G1, G2, G3, and G4, which forms a switch to which sharp pulses derived from the standard frequency source are also applied. The junction of diodes G1 and G2 is normally maintained at a relatively positive potential, and the junction of diodes G3 and G4 is normally maintained at a relative negative potential, so that the diodes G1-G4 are normally all blocked. Negative-going pulses from the standard source are periodically applied to the junction of the diodes G1 and G2 and, simultaneously, positive-going pulses from the standard source are applied to the junction of the diodes G3 and G4. When the pulses are so applied, the diodes G1-G4 are all rendered conductive, so that a connection is established between the point E1 and the output terminal A. The level of the potential at the point E1, at the instant of the scanning pulse, is thus communicated to the output terminal A.

A capacitor C4 connected between the output terminal A and ground functions to integrate and manifest the average potential applied to the output terminal A while the diodes G1-G4 are blocked, so that a *dc.* potential is manifested at the output terminal A corresponding to the average or arithmetic mean value of the pulses sampled by means of the diode bridge.

Figure 3:
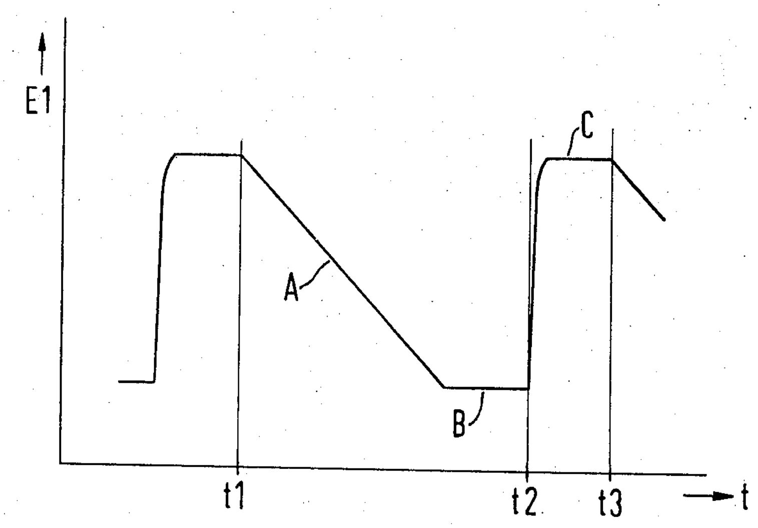
FIG. 3 is a graph illustrating one of the wave forms developed in the operation of the apparatus of FIG. 1 in greater detail.

If the free-running oscillator is operating at the same frequency as the standard source, the pulses applied to the diode bridge coincide with a given point on the sloping wave form portion A of each cycle of the wave form illustrated in FIG. 3. Accordingly, the potential developed at the output terminal is dependent upon the relative phase of the signal produced by the free-running oscillator, in relation to the standard phase represented by the instant during each cycle at which the pulses are applied. Such pulses are sometimes called scanning pulses. It can be seen that, if the scanning pulses appear early during the sloping portion A of the wave form shown in FIG. 3, a relatively high potential will be developed at the output terminal A, while a lower potential will be developed if the scanning pulses arrive at a later time, coinciding with a lower portion of the sloping wave form. Thus, the output voltage available at the terminal A is dependent upon the phase of the free-running oscillator and may effectively be employed to regulate the frequency and phase of the oscillator to maintain precise phase synchronism with the time of arrival of the standard pulses.

The scanning pulses are preferably very short in duration, so that only an instantaneous value of the wave form present at the point E1 is sampled during each cycle.

If the frequency of the free-running oscillator differs from that of the source of scanning pulses, the resulting signal available at the point A appears as a staircase wave form, since the scanning pulses appear at successively different portions of the saw-tooth wave form portions A, B, and C of the wave form illustrated in FIG. 3. This staircase wave form is repetitive in nature and has a fundamental frequency which is equal to the difference between the frequency of the free-running oscillator and the frequency of the scanning pulses. This average value, which has upon deviation of frequency the same value in its voltage level as the wave form according to FIG. 3, is used for the control of the free-running oscillator. For this purpose, the voltage at the point A is supplied to the otherwise ordinary elements of the regulating loop, via a low-pass filter LF to the frequency determining element of the free-running oscillator, such as a voltage variable capacitor or the like.

Referring to FIG. 3, the sloping portion A of the wave form is the linear voltage drop of the Miller integrator circuit, the slope (and, therefore, the duration) of which is determined by the time constant established by the values of the resistors R5 and R6 and the value of the capacitor C3. The portion B of each cycle of the wave form corresponds to saturation of the transistor T4. The total duration of portions A and B, which lies between time t1 and time t2, as illustrated in FIG. 3, is mainly determined by the time constant established by the values of the resistor R4 and the capacitor C2. The overall duration of portions A, B, and C of the wave form is the period of the free-running oscillator. Accordingly, since the durations of the portions A and B are relatively constant, only the duration of portion C varies in dependence upon the frequency of the signal applied to the input terminal Uos. It is apparent that as the portion C grows longer, the arithmetic mean value of a cycle of the wave form illustrated in FIG. 3 increases, while if the portion C is reduced in length, the arithmetic mean falls. AT any time that the free-running oscillator is not running at the same frequency as the scanning pulses applied to the diode gate, the scanning pulses coincide with successively different portions of the wave form of each cycle, and the arithmetic mean value of a continuous series of such samplings corresponds closely to the arithmetic mean value of the wave form. Then, as described above, the value of the voltage present at the output terminal A is dependent upon the phase relation between the signal produced by the free-running oscillator and the timing of the scanning pulses.

It can be seen that when the frequency of the free-running oscillator is too low, a relatively high *dc.* output potential is obtained, which is employed to increase the oscillator frequency (regulating the oscillator in accordance with the portion C of the wave form). Also, when the phase of the free-running oscillator lags (due, for instance, to a frequency which is slightly lower than the standard frequency) a relatively high *dc.* potential is again obtained, which is used to advance the phase of the oscillator by momentarily increasing the frequency thereof until the desired frequency is obtained, (regulating the oscillator in accordance with the portion A of the wave form). Many voltage controlled oscillators are known in the prior art, and so the precise details of the free-running oscillator are not described.

The arrangement of FIG. 1 is effective to produce, by a single control circuit, a control voltage which is not only in response to differences in frequency between the free running oscillator and the standard frequency, but also to differences in phase therebetween.

In the embodiment shown in FIG. 1, the phase comparison of two signal frequencies is effected by a known scanning method, one of the oscillations which is to be compared being converted into a time linear saw-tooth voltage, while the other oscillation controls a switch which operates with the same timing as this oscillation, and during short scanning periods switches through the instantaneous value of this saw-tooth voltage to an integration stage which provides a signal that serves as a control value for the frequency adjusting element of the free-running oscillator. If the two oscillations exactly agree, this frequency adjusting voltage is constant, since during each scanning the same instantaneous value of the saw-tooth voltage appears. In the case of any phase deviation between the two oscillations, a control voltage arises in the control loop which opposes the change in known manner. The saw-tooth wave form is preferred for this purpose because it provides for the maximum single value range of values for the phase discriminator, since in any one period it is only the fly-back movement, which is very short in comparison to the forward movement, which cannot be exploited, so that a detectable range of almost 360° is obtainable.

However, if the fundamental frequencies of the oscillations which are to be compared differ, than the resulting control value appears as a staircase wave form as the scanning pulses appear successively at different points of the saw-tooth, in successive periods. There is thus formed a staircase voltage wave form, the fundamental frequency of which is equal to the frequency difference of the oscillations which are to be compared with one another. If this difference is small, as a result of the wobbulator voltage which is formed on the adjusting line, the free-running, voltage-controlled oscillator can obtain a frequency range which is such that it reaches the locked-in state for the phase control. However, for various reasons, the adjusting voltage for the voltage-controlled oscillator generally contains relatively large value filter elements having a high time constant, so that the wobbulator voltage which is formed, particularly in the case of a large frequency difference, may be reduced in such a manner that the oscillator no longer reaches the locked-in value. The oscillator frequency then fluctuates around a mean value which corresponds to the mean value of the phase bridge output voltage, but with too small a frequency sweep range. The present invention avoids this disadvantage in that the mean value of this phase bridge output voltage is displaced in the correct direction in dependence upon the oscillator frequency, and thus lock-in is simplified.

For this purpose, the oscillation supplied by the oscillator is converted in such manner that, in addition to the voltage change required for phase control, within any one period, there is also a change in the arithmetic mean value of the voltage in dependence upon the period duration of the non-consant oscillation. A particularly favorable oscillation wave form for this purpose is a saw-tooth form with chopped peaks. The gradient of the saw-tooth, which codetermines the phase gradient of the control loop, should remain substantially the same at all frequencies in the swept range.

What is claimed is:

1. In a stabilized oscillator having a circuit for stabilizing the frequency and phase of the oscillator, the combination comprising a pulse shaper to provide an output wave form for each cycle of said oscillator, said wave form including a sloping portion having a substantial duration which is independent of the frequency of said oscillator and a non-sloping portion having a duration which is dependent on the frequency of said oscillator, whereby the arithmetic mean value of said wave form is a function of the frequency of said oscillator, and sampling means for periodically sampling the instantaneous level of said wave form and for developing a control voltage for controlling said oscillator in response thereto.

2. Apparatus according to claim 1, including sampling means for sampling the instantaneous value of said wave form periodically in synchronism with a standard signal.

3. Apparatus according to claim 1, wherein said sampling means comprises a diode bridge, means for periodically unblocking said diodes, means for connecting said wave form to the input of said bridge, and means for connecting said integrating means to the output of said bridge.

4. Apparatus according to claim 1, including a Miller integrator for developing said sloping portion in response to a predetermined portion of each cycle of operation of said free-running oscillator.

5. Apparatus according to claim 1, wehrein said wave form includes a first non-sloping portion corresponding to the lower limit of said sloping portion and a second non-sloping portion corresponding to the upper limit of said sloping portion.

6. A method of synchronizing an oscillator with a standard frequency source comprising the steps of generating a wave form for each cycle of said oscillator, said wave form having a sloping portion of substantial duration, the said duration being independent of frequency, and a non-sloping portion, sampling the instantaneous level of said wave form periodically, and deriving a control signal for controlling said oscillator.

7. The method according to claim 6, including the step of sampling said wave form periodically in synchronism with said standard frequency.

* * * * *